United States Patent [19]
Clark

[11] Patent Number: 6,058,315
[45] Date of Patent: *May 2, 2000

[54] SPEAKER ASSEMBLY FOR A RADIOTELEPHONE

[75] Inventor: Joel A. Clark, Woodridge, Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/614,748

[22] Filed: Mar. 13, 1996

[51] Int. Cl.$^7$ ........................................ H04Q 7/32
[52] U.S. Cl. ........................... 455/550; 455/575; 455/90; 379/428; 379/433; 379/430
[58] Field of Search ..................... 455/550, 424, 455/90, 575; 381/158, 90, 24; 181/148, 151; 379/428, 429, 432, 433, 431, 430; D14/138, 420

[56] References Cited

U.S. PATENT DOCUMENTS

| | | | |
|---|---|---|---|
| D. 385,873 | 11/1997 | Nagele et al. | D14/138 |
| 3,952,159 | 4/1976 | Schott | 179/181 |
| 4,029,170 | 6/1977 | Phillips | 181/148 |
| 4,128,738 | 12/1978 | Gallery | 179/181 |
| 4,142,604 | 3/1979 | Smith | 181/156 |
| 4,163,875 | 8/1979 | Cogan | 379/433 |
| 4,437,539 | 3/1984 | Festa | 181/145 |
| 4,440,260 | 4/1984 | Jacobsen | 181/172 |
| 4,727,583 | 2/1988 | Weber | 381/90 |
| 5,014,346 | 5/1991 | Phillips et al. | 379/428 |
| 5,068,917 | 11/1991 | Sugiyama et al. | 455/90 |
| 5,153,915 | 10/1992 | Farella | 381/188 |
| 5,168,527 | 12/1992 | Loya | 381/188 |
| 5,194,701 | 3/1993 | Yamada-Scriba | 181/151 |
| 5,327,507 | 7/1994 | Suzuki | 381/158 |
| 5,369,701 | 11/1994 | McAteer et al. | 379/429 |
| 5,394,467 | 2/1995 | Kepley, III et al. | 379/433 |
| 5,668,867 | 9/1997 | Nagai | 379/433 |

FOREIGN PATENT DOCUMENTS

| | | |
|---|---|---|
| 0364935 A1 | 4/1990 | European Pat. Off. . |
| 1295363 | 11/1972 | United Kingdom . |

OTHER PUBLICATIONS

E. Kerschbaum, AKG Acoustics, Dynamic Transducer IXMR specification, Revision #3, Jun. 22, 1995, 5 pages.

*Primary Examiner*—Wellington Chin
*Assistant Examiner*—Keith Ferguson
*Attorney, Agent, or Firm*—Williams, Lalita Kordich, Donald

[57] ABSTRACT

A speaker (302) is arranged in an enclosure formed by a front housing portion (200) and a rear housing portion (202), so that an air-gap is between a diaphragm (314) of the speaker and ports (114) formed in the front housing that face the diaphragm. The air-gap provides an acoustic leak into the enclosure, which makes the frequency response of the speaker relatively independent of the seal formed by a human ear and the front housing portion. Sound-absorbing material (304,300) disposed on either side of the speaker, ports that extend beyond the circumference of the speaker, and a filter (600) can be added to further enhance the audio quality of the speaker.

11 Claims, 4 Drawing Sheets

6,058,315

SPEAKER ASSEMBLY FOR A RADIOTELEPHONE

FIELD OF THE INVENTION

The present invention relates generally to the field of wireless communication, and more particularly to a speaker assembly for a radiotelephone. Although the invention is subject to a wide range of applications, it is especially suited for use in handheld radiotelephone equipment, and will be particularly described in that connection.

BACKGROUND OF THE INVENTION

A handheld radiotelephone employs a speaker to convert electrical signals into sound waves in the human-audible frequency range of 20 Hertz (Hz) to 20,000 kiloHz (kHz), thus enabling a user of the phone to hear a representation of a caller's voice, as well as other sounds such as dial tones. The quality of the sound reproduction is an important factor in a customer's decision to buy a handheld radiotelephone. Audio quality of a speaker is determined by its frequency response over the audible frequency range. Manufacturers of speakers normally provide a specified frequency response of a speaker when it is used in a "free-field" environment. Speakers employed in radiotelephones, however, are rarely used in a free-field environment. Instead, the user places the radiotelephone against his ear to hear the sound, and the speaker is positioned very close to the human ear.

The goal of an acoustic engineer in the radiotelephone field is to choose the combination of speaker, enclosure, and preconditioning electrical circuitry that provides an acceptable audio quality. An acceptable audio quality is usually a measure of how flat, or variable, the frequency response of the speaker is in its environment over the frequency range of 300 Hz to 4 kHz. The flatter, or less variation, of the frequency response, the better the audio quality. A frequency response that is higher, or boosted, in the low frequencies than in the high frequencies will sound bassy and muffled; whereas a frequency response that is higher in the high frequencies than in the low frequencies will sound shrill and tinny.

Two types of speaker technology are in predominate use for handheld radiotelephones—piezo-electric speakers and dynamic speakers. Both speaker technologies are specified to work with an airtight seal between the speaker and the human ear. Achieving the airtight seal requires that the speaker have an airtight mount to the handheld radiotelephone housing and the radiotelephone housing have an airtight coupling where the housing meets the ear. The ear-housing coupling is achieved by forming a depression in the housing that conforms to the shape of the human ear. As long as the airtight seal is maintained, these types of speakers have been able to provide an acceptable frequency response.

As handheld radiotelephones become smaller in size, an airtight ear-housing coupling is difficult to achieve for all users because the housing is not large enough to form a depression in the housing surface that accommodates the size of all human ears. Consequently, for some users, an air leakage occurs between the housing and the human ear, resulting in a loss, or attenuation, of low frequency response. Tests on various speakers, including a Primo brand CR9 piezoelectric-type speaker have shown that this loss can average 15 decibels (dB) at 300 Hz, resulting in a tinny sound.

A low-acoustic impedance dynamic speaker is designed to boost the frequency response at the low end of the frequency range, and can be used to remedy the bass loss caused by air leakage between the housing and the human ear. An example of such a speaker is model no. HDR 0970 available Hosiden, Inc. Such a speaker—when mounted with an airtight seal between the speaker and the housing—however, exhibits excessive low frequency gain when an airtight seal is formed between the housing and the human ear. Consequently, the sound is bassy and muffled. Furthermore, there is a large variation of about 11 dB between the highest and lowest point in the frequency response, thus the audio quality is poor.

The size of the smaller handheld radiotelephones not only affects the seal between the housing and the human ear but also the size of the enclosure housing the speaker. Smaller handheld radiotelephones have less space to house the enclosure, and the size of the enclosure affects the frequency response of the speaker.

A need therefore exists for a speaker assembly for small handheld radiotelephones, which has limited space for enclosing the speaker and limited size for providing an airtight seal with the human ear, that provides acceptable audio-quality.

DETAILED DESCRIPTION OF THE PREFERRED EMBODIMENTS

The speaker assemblies described herein provides advantages over known speaker assemblies for small handheld radiotelephones in that they provide acceptable audio-quality when housed in a small enclosure that is independent of whether an airtight seal is formed between the housing and the human ear.

In one such embodiment configured according to the present invention, a front housing portion and a rear housing portion form an enclosure that houses a low-acoustic impedance speaker disposed a predetermined distance from the at least one port formed in the front housing portion.

Reference will now be made in detail to a speaker assembly configured according to the present invention.

Figure 1:
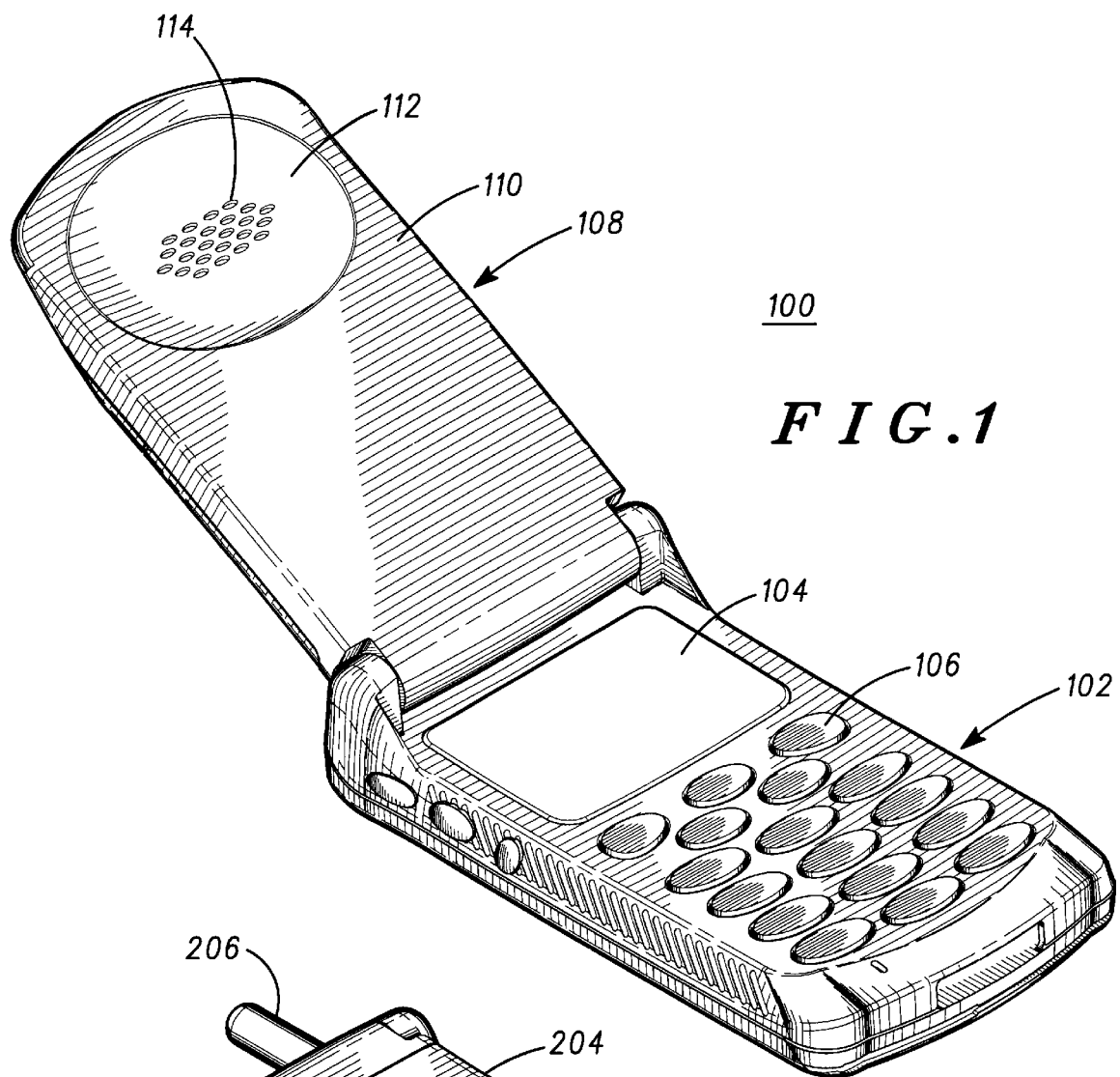
FIG. 1 is an isometric view of a radiotelephone in the open position.

FIG. 1 is an isometric view of a foldable, handheld radiotelephone 100 in the open position. Radiotelephone 100 comprises a lower housing 102 supporting circuitry, a display 104, and a keypad 106. Attached to lower housing 102 is an upper housing 108 having a front surface 110. A depression 112 is formed on front surface 110 and a plurality of ports 114 are disposed in the depression and extend from front surface 110 through a rear surface. Depression 112 is of a size that may not form an airtight seal with all sizes of human ears.

Figure 2:
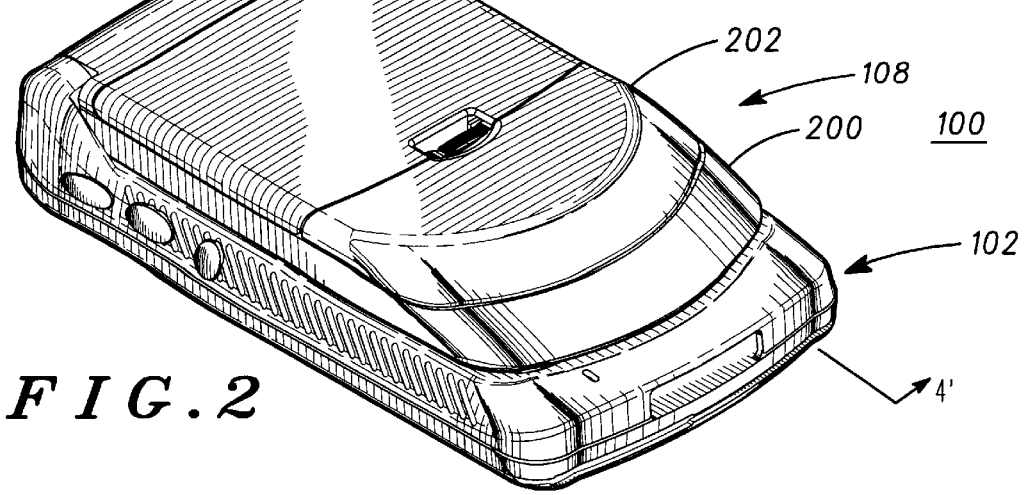
FIG. 2 is an isometric view of a radiotelephone shown in FIG. 1 in the closed position.

FIG. 2 is an isometric view of the radiotelephone shown in FIG. 1 in the closed position. An antenna 206 protrudes from lower housing 102. This figure illustrates that upper housing 108 includes a front upper-housing portion 200 having a front surface 110 (see FIG. 1), a rear upper-housing portion 202 that is removably affixed to front upper-housing portion 200, and a battery 204 that is removably affixed to front upper-housing portion 200.

Figure 3:
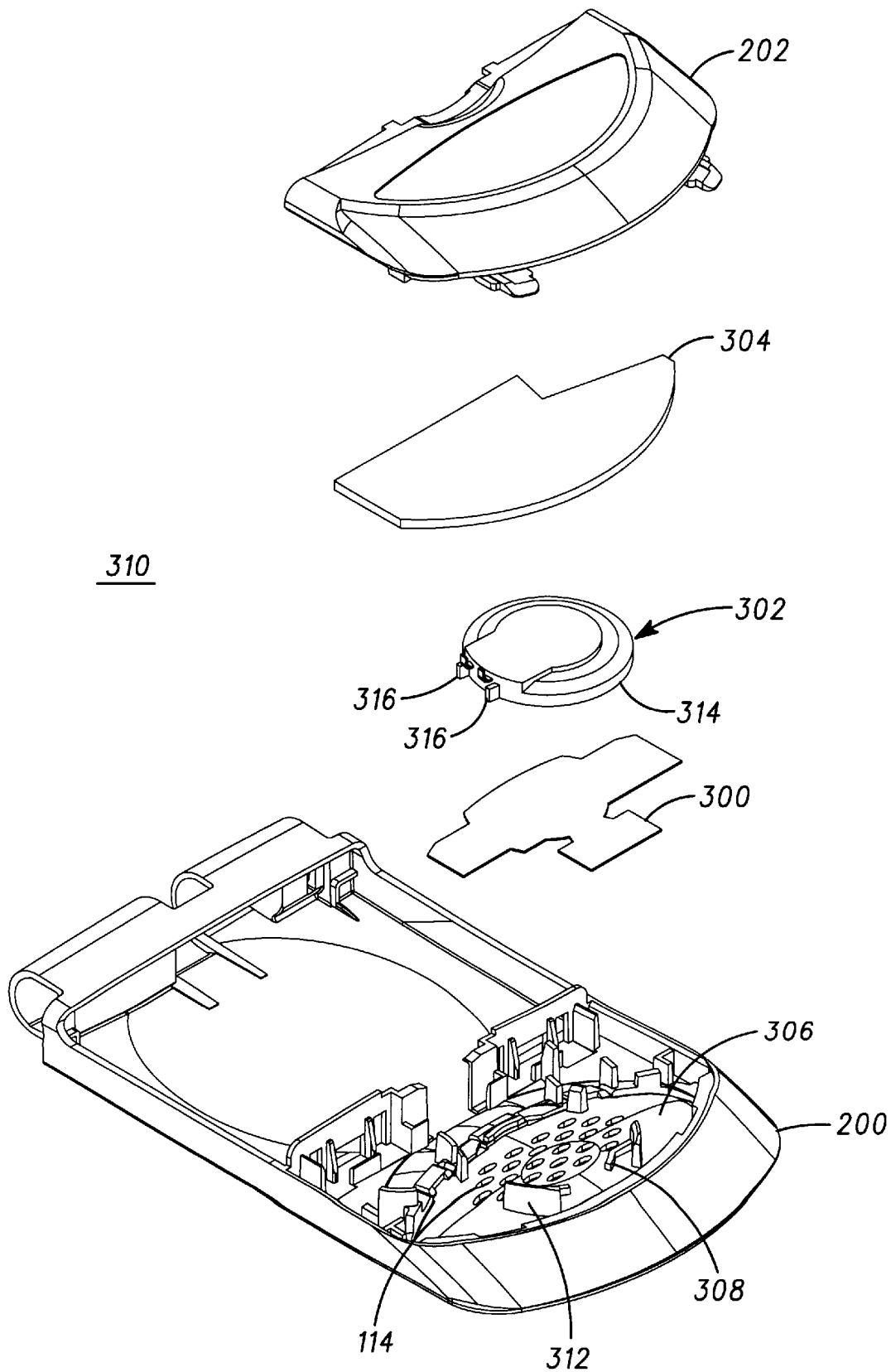
FIG. 3 is an exploded view of a speaker assembly of the radiotelephone shown in FIG. 1.
Figure 4:
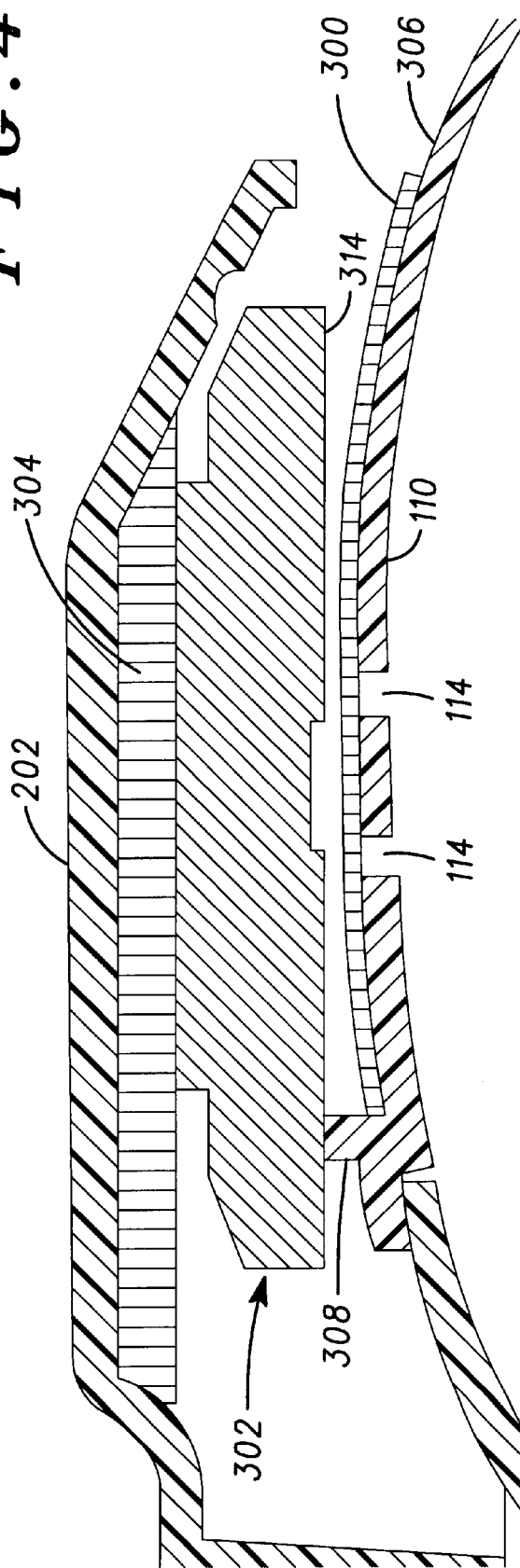
FIG. 4 is a partial cross section view of an assembled speaker assembly shown in FIG. 2.

Details of the structure of a speaker assembly configured according to the invention will now be discussed with reference to FIGS. 3 and 4. FIG. 3 is an exploded view of parts of a speaker assembly 310 of the radiotelephone shown in FIG. 1; and FIG. 4 is a partial cross-section view of the assembled speaker assembly 310 taken in the direction shown in FIG. 2. Speaker assembly 310 includes the previously described front upper-housing portion 200 and rear upper-housing portion 202. The plurality of ports 114 are shown extending through a rear surface 306 of front upper-housing portion 200. When front upper-housing portion 200 and rear upper-housing portion 202 are attached, an enclosure is formed to house a first sound-absorbing material 300, a low-acoustic impedance speaker 302, and a second sound-absorbing material 304.

Formed and protruding from rear surface 306 are a plurality of standoffs 308 and a plurality of guides 312. Guides 312 are arranged to position speaker 302 into the enclosure during assembly, and to prevent lateral movement of speaker 302. Standoffs 308 are arranged so that speaker 302 rests on them at a predetermined distance from rear surface 306 determined by the height of standoffs 308. In this position, a diaphragm 314 of speaker 302 is disposed adjacent and facing the plurality of ports 114, with an air-gap between diaphragm 314 and ports 114. Furthermore, guides 312 and standoffs 308 are arranged so that air can leak from the air-gap to the edges of the enclosure by flowing past guides 312 and standoffs 308, and back again. As shown in FIG. 4, when rear upper-housing portion 202 is attached to front upper-housing portion 200, speaker 302 is fixedly held between the rear upper-housing portion 202 and the plurality of standoffs 308 in the enclosure.

The air-gap and air-leak provided by standoffs 308 are an important feature of the invention because they provide a frequency response that is relatively independent of the seal between the housing and the ear. Standoffs 308 ensure a gap is formed between speaker 302 and front upper-housing portion 200, and a passage is formed for air to leak laterally from the air gap into the enclosure. This feature is illustrated in FIG. 4, which shows speaker 302 facing ports 114 with an air-gap between them, and a passage opposite standoff 308 for air to leak from the air-gap. The air-gap and passage, which ensure that speaker 302 does not have an airtight seal with upper housing 108, provides an acoustic leak for speaker 302 regardless of whether an airtight seal is formed between upper housing 108 and the human ear. Thus, when the gap and passage provides enough air leakage, the frequency response of speaker 302 is relatively independent of the seal between the housing and the ear. The technique for selecting the appropriate air-gap for a certain enclosure and speaker is readily understood by one of ordinary skill in the art.

The use of a non-air-tight speaker in an enclosure with ports only within the circumference of the diaphragm projected onto rear surface 306 will introduce interference at the ports. Sound waves that are generated out the vents in the back of the speaker—and are reflected off rear upper-housing portion 202—combine with the sound waves generated by the diaphragm in front of ports 114. This sound wave interference causes attenuation in the frequency response at around 1.5 kHz.

Another important feature of the invention is disposing a sound-absorbing material 304, such as felt, between rear upper-housing portion 202 and speaker 302 to reduce the attenuation caused by sound-wave reflections. Sound-absorbing material 304 is cut to fit in place, and is attached, to rear upper-housing portion 202 with glue. Sound-absorbing material 304 absorbs the sound waves generated out the back vents and reduces the reflections off rear upper-housing portion 202. Tests have shown a 3 dB improvement in the attenuation at around 1.5 kHz.

Figure 5:
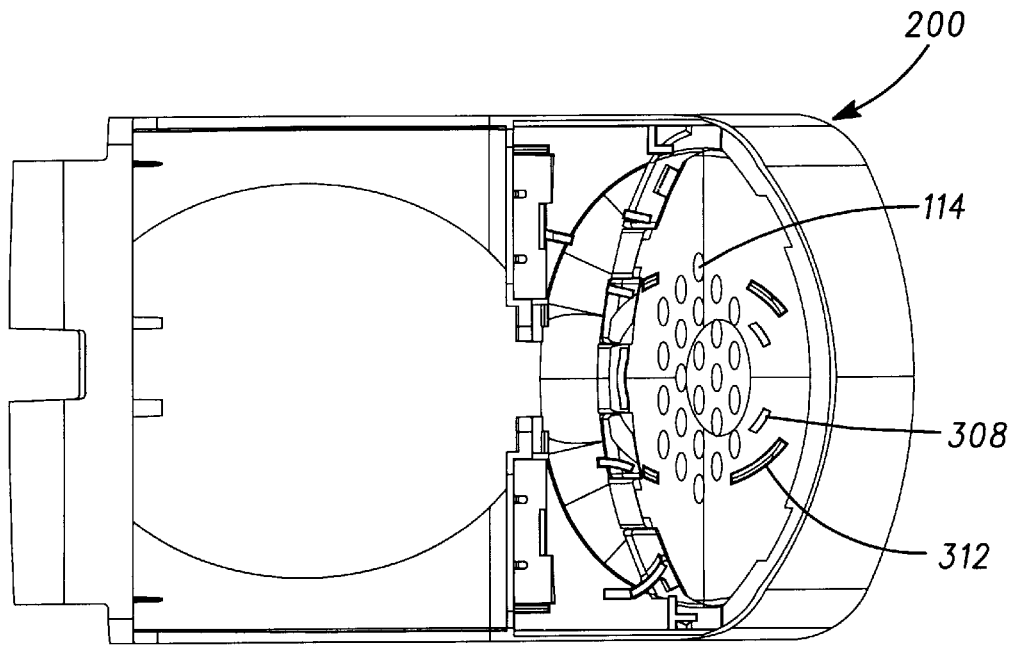
FIG. 5 is a top plan view of an upper, front housing portion.

Another means to reduce sound waves from interfering, is to provide ports beyond the perimeter of the diameter of speaker 302 projected onto rear surface 306. This allows the air flow of reflected sound waves to pass through the ports beyond the perimeter, while the air flow of sound waves generated by the diaphragm can flow through the ports within the perimeter of speaker 302. FIG. 5 is a top plan view of front upper-housing portion 200 showing such an arrangement of ports. There are 6 ports on or extending outside the perimeter formed by guides 312 that allow the passage of air flow of reflected sound waves. Tests have shown an additional 3 dB improvement in the attenuation by using the outer-perimeter ports.

Another means to affect the frequency response is to dispose a sound-absorbing material 300 between rear surface 306 and speaker 302. Sound-absorbing material 300 can be attached to rear surface 306 to cover ports 114 and prevent dust from entering ports 114. Sound-absorbing material 300 boosts the frequency response for frequencies less than 1 kHz.

Figure 6:
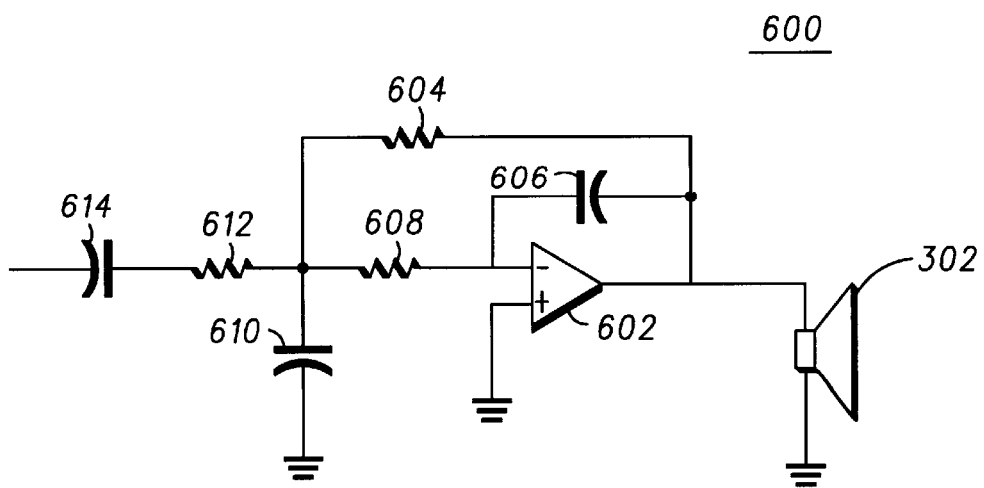
FIG. 6 is an electrical schematic of a low-pass electric filter.

Although the attenuated frequency response at around 1.5 kHz can be brought within an acceptable variation of the frequency response by using sound-absorbing material 304 and the outer-perimeter ports, and the low frequency response can be boosted with sound-absorbing material 300, the sound wave interference also causes enhancement of the frequency response at around 3.5 kHz. This peak at the high-end of the audible-frequency spectrum can be easily corrected with a complex 2-pole low-pass filter 600, as shown in FIG. 6, to precondition the electric signals before they are inputted to speaker 302. This flattening of the peak produces a flat response with high-quality audio.

In the preferred embodiment, a differential amplifier 602 is coupled with speaker 302, and a capacitor 614 is 0.1 microfarads, a resistor 612 is 18 kilo-ohms, a capacitor 610 is 0.033 microfarads, a resistor 608 is 10 kiloohms, a resistor 604 is 18 kilo-ohms, and a capacitor 606 is 1000 picofarads.

In summary, a speaker assembly for radiotelephones has been described that provides acceptable audio-quality when housed in a small enclosure that is independent of whether an airtight seal is formed between the housing and the human ear.

What is claimed is:

1. A radiotelephone comprising:
 a front upper housing portion having a front surface and a rear surface, the rear surface having a first porting area and a second porting area, the first and second porting areas each defining at least one port extending from the front surface to the rear surface;
 a rear upper housing portion disposed relative the front upper housing portion to form an enclosure between the rear upper housing portion and the front upper housing portion;
 at least one standoff having portions of different heights carried on the rear surface and positioned around the first porting area; and a speaker resting on the at least one standoff and disposed a predetermined distance from and covering the first porting area, thereby providing an air gap between the speaker and the front upper housing and thereby creating a passage for air to leak from the air gap into the enclosure;

wherein the second porting area is not covered by the speaker.

2. The radiotelephone of claim 1 further comprising a low-pass electric filter, coupled with the speaker, for filtering audio frequency signals generated by the radiotelephone before the signals are input to the speaker.

3. The radiotelephone of claim 1 further comprising a complex 2-pole low-pass filter, coupled with the speaker, for filtering audio frequency signals generated by the radiotelephone before the signals are input to the speaker.

4. The radiotelephone of claim 1 further comprising a sound-absorbing material disposed between the speaker and one of the first and second porting areas.

5. The radiotelephone of claim 4 wherein the sound-absorbing material is attached to the rear surface and covers one of the first and second porting areas.

6. The radiotelephone of claim 1 further comprising a sound-absorbing material disposed between the speaker and the rear upper housing portion.

7. The radiotelephone of claim 6 wherein the sound-absorbing material is attached to the rear upper housing portion.

8. A radiotelephone comprising:

a front upper housing portion having a front surface and a rear surface, the rear surface having a first area and a second area, the first and second areas each having a plurality of ports extending from the front surface to the rear surface, the front upper housing portion having a plurality of standoffs protruding from the rear surface and surrounding the plurality of ports in the first area;

a rear upper housing portion disposed relative the front upper housing portion to form an enclosure between the rear upper housing portion and the front upper housing portion; and a speaker resting on the plurality of standoffs and disposed a predetermined distance from and covering the plurality of ports in the first area, thereby providing an air gap between the speaker and the front upper housing, the speaker having a diaphragm facing the plurality of ports in the first area;

wherein when the speaker is resting on the plurality of standoffs an air passage is created for air to leak from the air gap into the enclosure and wherein the second area having a plurality of ports is not covered by the speaker.

9. The radiotelephone of claim 8 further comprising a complex 2-pole low-pass filter, coupled with the speaker for filtering audio frequency signals generated by the radiotelephone before the signals are input to the speaker.

10. The radiotelephone of claim 8 further comprising a sound-absorbing material disposed between the speaker and the rear upper housing portion.

11. The radiotelephone of claim 8 further comprising a sound-absorbing material disposed between the speaker and the front upper housing portion.

* * * * *